(No Model.)  3 Sheets—Sheet 2.

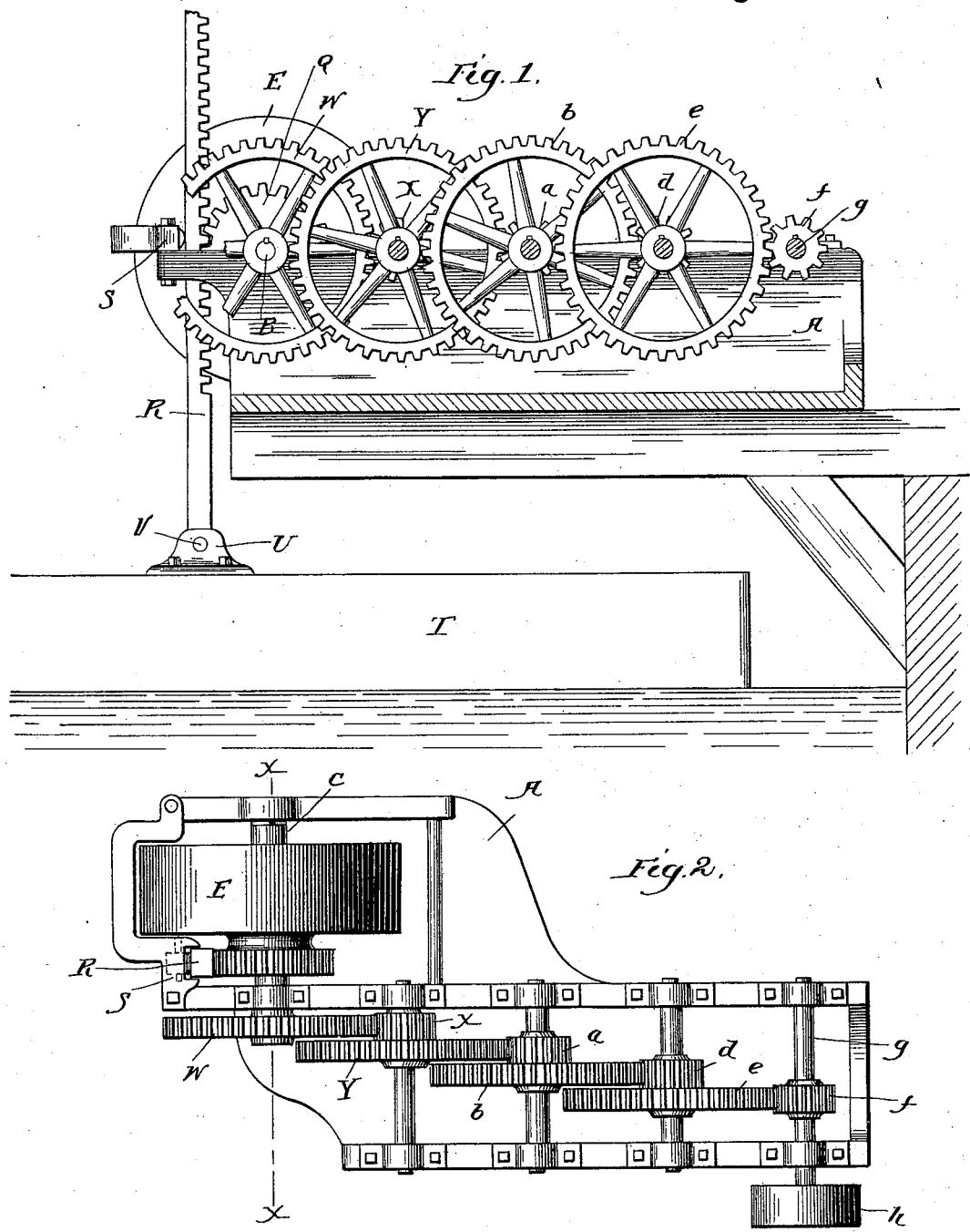

C. A. PRESCOTT.
TIDAL MOTOR.

No. 589,367. Patented Aug. 31, 1897.

WITNESSES:
H. B. Hallock
S. S. Williamson

INVENTOR
Charles A. Prescott
BY Geo. H. Holgate
ATTORNEY.

(No Model.) 3 Sheets—Sheet 3.

C. A. PRESCOTT.
TIDAL MOTOR.

No. 589,367. Patented Aug. 31, 1897.

WITNESSES
H. B. Hallock
S. Williamson

INVENTOR.
Charles A. Prescott,
BY Geo. H. Holgate
ATTORNEY

UNITED STATES PATENT OFFICE.

CHARLES A. PRESCOTT, OF VICTORIA, CANADA.

TIDAL MOTOR.

SPECIFICATION forming part of Letters Patent No. 589,367, dated August 31, 1897.

Application filed October 24, 1896. Serial No. 610,005. (No model.)

*To all whom it may concern:*

Be it known that I, CHARLES A. PRESCOTT, a subject of the Queen of Great Britain, residing at Victoria, British Columbia, Canada, have invented certain new and useful Improvements in Tidal Motors, of which the following is a specification.

This invention relates to a new and useful improvement in motors for utilizing the rising and falling of the tide to generate power, and has for its object to so construct a machine of this description as to readily convert the force incident to the buoyancy of a vessel or float in operating the machine during the rising of the tide and the weight of said vessel or float in operating it during the falling of the tide.

With these ends in view this invention consists in the details of construction and combination of elements hereinafter set forth and then specifically designated by the claims.

In order that those skilled in the art to which this invention appertains may understand how to make and use the same, its construction and operation will now be described in detail, referring to the accompanying drawings, forming a part of this specification, in which—

Figure 3:
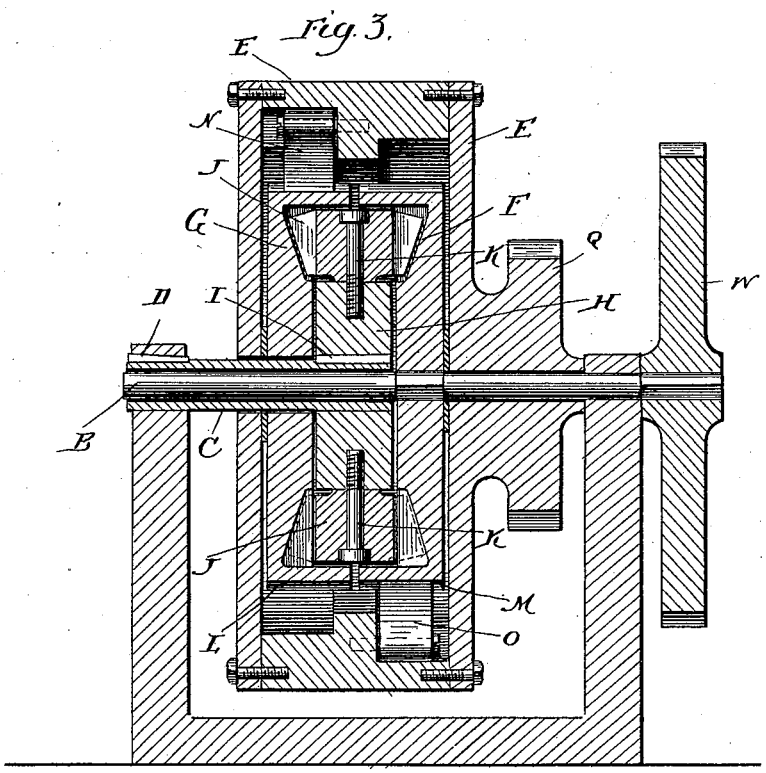
Figure 4:
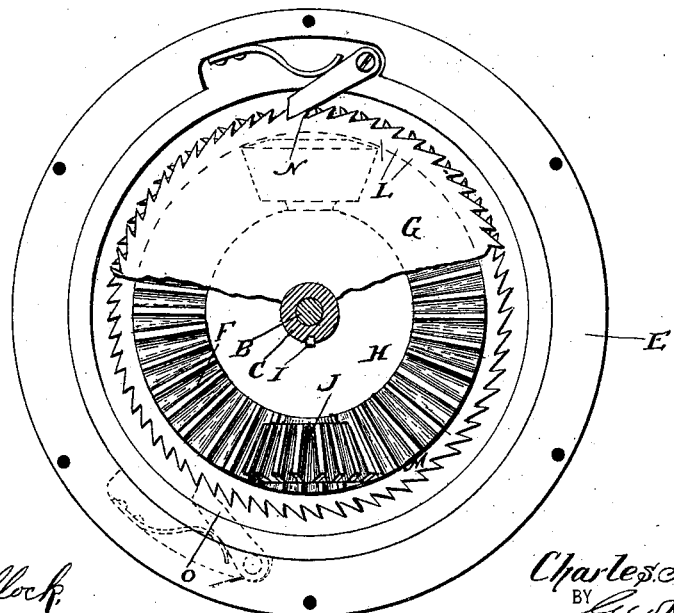
Figure 5:
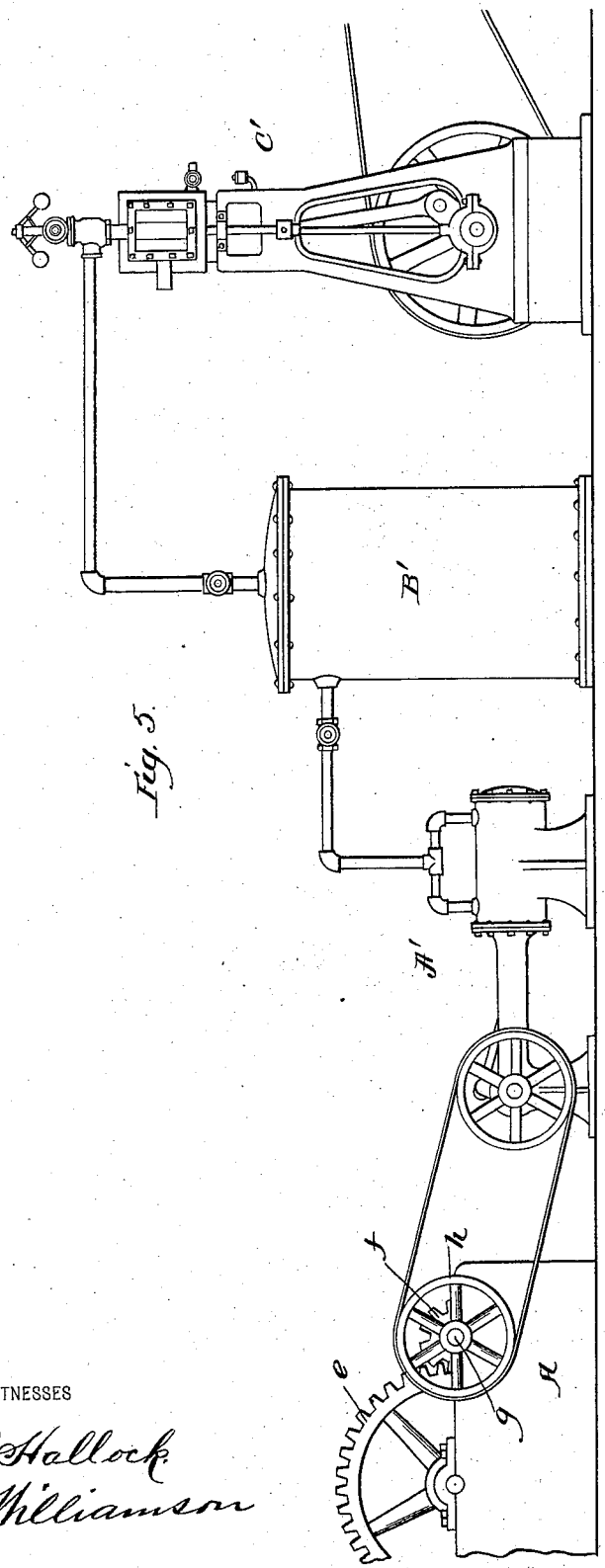

Figure 1 is a side elevation of a machine built in accordance with my improvement, a portion of the casing being sectioned away, so as to clearly show the train of gears for multiplying the speed of the power-wheel; Fig. 2, a plan view of the machine; Fig. 3, a section at the line $xx$ of Fig. 2; Fig. 4, a view looking into the power-wheel, the latter having one of the caps thereof removed, one of the beveled gears being partly broken away; and Fig. 5, a diagrammatical view illustrating the arrangement of a suitable reservoir, air-pump, and motor for storing a certain percentage of the power generated by the tidal motor during its active operation and for delivering said stored power during the times of inactivity of said motor.

In carrying out this invention I provide a frame A, which is of such shape and size as to readily support the operating parts of the machine, and in one end thereof is journaled the shaft B, around a portion of which is placed the sleeve C, the latter being held from rotation by a key D, fitted partly within the sleeve and partly within the bearing. Upon this sleeve and shaft is mounted a drum-wheel E, and inclosed therein is a beveled gear F, which is rigidly secured to the shaft B, and a gear-wheel G, loosely mounted upon the sleeve, so as to revolve thereon, and also mounted upon the sleeve is a disk H, secured thereto by a key I, whereby it is prevented from revolving with the gear-wheels, and upon this disk is journaled the beveled pinions J by means of the bolts K.

Pinions J are arranged to mesh with the beveled gears, so that when one of said gears is turned the other will be revolved in an opposite direction, and the gear-wheels F and G have formed upon their peripheries the ratchet-teeth L and M, respectively, and with the former set of teeth engages the pawl N and with the latter the pawl O, said pawls being held in engagement with their respective teeth by the springs P. These pawls are pivoted to the interior of the drum-wheel, so that when said wheel is revolved in either direction one or the other of the beveled gears will be revolved, and from the above description it is obvious that when the gear G is revolved in one direction its motion will be imparted, through the gear F, in the opposite direction by the pinions J, and as this last-named gear is rigid upon the shaft B it follows that the shaft will revolve in the opposite direction, and when the drum-wheel is turned in the opposite direction the pawl N will slip backwardly over the teeth of the gear-wheel G, while the pawl O will act upon the gear-wheel F to revolve it in the same direction in which it was before revolved by the action of the gear Q, thus causing the shaft B always to revolve in one direction regardles of the direction in which the drum revolves.

A gear-wheel Q is secured to one end of the drum-wheel, so as to turn the latter, and with this gear-wheel meshes the vertical rack-bar R, the latter being held in engagement with the gear by means of suitable guides S, so that when the bar is raised or lowered a rotary motion in one direction or the other is imparted to the drum-wheel for the purpose just set forth.

In practice a large float T is placed within the water and has secured thereto a bracket U, to which is pivoted at V the rack-bar, so that when this float is raised or lowered by the action of the tide the rack-bar will be likewise raised and lowered, and the motor thereby caused to operate.

When found convenient, the float may be a vessel of any description, such as a scow or ship, and in case the ship is higher than the wharf upon which the motor is located the beam may be secured to the deck thereof in such manner as to overhang the wharf, when the rack-bar will be secured to this beam for convenience of retaining the location of the motor upon the wharf or locating it below the level of the vessel.

Since the action of the tide is comparatively slow, the rising or falling of the float, while exerting an exceedingly large force, of necessity would have to be multiplied in speed, so as to be utilized for ordinary mechanical purposes, and this I accomplish by securing upon one end of the shaft B a gear-wheel W of considerable diameter, which meshes with a pinion X, mounted upon a suitable shaft journaled within the frame of the machine, and this pinion is secured to a gear-wheel Y, which in turn meshes with the pinion $a$, secured to a gear-wheel $b$, the latter again meshing with the pinion $d$, which is secured to the gear-wheel $e$, the last-named gear in turn meshing with the pinion $f$, secured upon the drive-shaft $g$, upon which may be carried a belt-wheel $h$ for transmitting power to any suitable location. By this train of gears the slow motion transmitted from the float to the drum-wheel will be multiplied many times, so that the pulley $h$ will revolve at a high rate of speed.

As is well known, at the turning of the tide there is a considerable length of time in which no perceptible movement either up or down takes place, and in order to provide against the stopping of the machinery driven by the motor at these turning-points an air-compressor A' may be connected with the motor, so as to supply air under considerable pressure to a tank or reservoir B', from whence it may be withdrawn for the operation of a compressed-air motor C', so as to continue the operations of the machinery during the time the float is at rest, in which case the air-compressor should be so regulated relative to the power generated by the motor as to accumulate sufficient compressed air for the continuance of the operations of the machinery through the desired length of time without materially decreasing the effective operating power of the motor when run by the float.

One of the advantageous uses to which my improvement may be put is for generating power for the loading and unloading of vessels when standing adjacent a wharf, in which the motor may be located upon the wharf and a beam secured to the vessel and connected with the motor, as before described, so that the riding of the vessel upon the water would produce the desired motion for the operation of suitable derricks of block and tackles. In loading and unloading in this manner no cause for fuel or horse-power would be necessary, and every wharf at which vessels were loaded and unloaded might be supplied with one or more of my improved motors with convenient arrangement for attaching or detaching the motor from the vessel, thus causing the vessel to create the power without cause for loading or unloading the same.

Having thus fully described my invention, what I claim as new and useful is—

1. A tidal motor, consisting of a drum-wheel carrying pawls, two beveled gears mounted side by side, said gears having ratchet-teeth for engagement with the pawls, beveled pinions for causing the gears to move in unison but in opposite directions, means for transmitting this motion to a train of gears always in one direction, a rack-bar arranged to mesh with a gear-wheel carried by the drum-wheel, and a float such as a scow or ship for raising and lowering the rack-bar by the action of the tide, as specified.

2. A motor of the character described, consisting of a frame, a shaft journaled therein, a sleeve arranged around a portion of said shaft, a disk secured to said sleeve, said sleeve being held against rotation, beveled pinions carried by the disk, beveled gear-wheels F and G, the former being secured to the shaft and the latter loosely mounted upon the sleeve, said gears meshing with the pinions, ratchets formed upon the gears, a drum-wheel inclosing said gears, pawls pivoted within said drum-wheel and adapted to engage the teeth of the ratchets, a gear Q carried by the drum-wheel, a rack-bar meshing with said gear, a float to which said rack-bar is attached, and a train of gears for increasing the motion imparted to the drum-wheel by the float, substantially as and for the purpose set forth.

3. In a tidal motor of the character described, a shaft journaled in a suitable frame, a drum-wheel mounted upon said shaft, a sleeve so arranged as to allow the shaft to revolve freely therein, a disk secured to the sleeve so as to remain stationary therewith, beveled pinions mounted upon the disk, a beveled gear F rigidly secured to the shaft and meshing with the pinions, a beveled gear G loosely mounted upon the sleeve and also meshing with the beveled pinions, ratchet-teeth formed upon each of the beveled gears, pawls carried by the drum-wheel and adapted to engage the ratchet-teeth in opposite directions, springs for holding said pawls in engagement with the teeth, a gear-wheel Q carried by the drum-wheel, a rack-bar meshing with the last-named gear, and a float to which said rack-bar is secured for causing the revolving of the drum-wheel in opposite directions by the rising and falling of the tide, substantially as and for the purpose set forth.

4. The herein-described motor, consisting of a frame, a shaft B journaled within said frame, a sleeve C arranged around said shaft but made stationary by connection with one of the bearings, a drum-wheel mounted upon said shaft, and sleeve so as to revolve independent of the latter, a disk H secured upon the sleeve, beveled pinions J journaled upon the disk, a beveled gear F rigidly secured upon the shaft B and meshing with the beveled pinions, a pawl O pivoted to the drum-wheel, ratchet-teeth formed upon the beveled gear F and so set as to be engaged by the pawl in one direction, a beveled gear G loosely mounted upon the sleeve and meshing with the beveled pinions, ratchet-teeth formed upon said gear oppositely disposed to the disposition of the teeth to the beveled gear F, a pawl N pivoted to the drum-wheel and adapted to drive the gear G in one direction, a gear-wheel Q carried by the drum-wheel, a rack-bar R arranged to mesh with the last-named gear-wheel, a float T to which said rack-bar is secured and by means of which it is moved up and down through the action of the tide, and a series of gear-wheels and pinions arranged to increase the motion of the drum, substantially as and for the purpose set forth.

In testimony whereof I have hereunto affixed my signature in the presence of two subscribing witnesses.

CHARLES A. PRESCOTT.

Witnesses:
S. S. WILLIAMSON,
C. C. ADAMS.